(12) United States Patent
Spick et al.

(10) Patent No.: US 12,664,763 B2
(45) Date of Patent: Jun. 23, 2026

(54) GENERATING DATASETS FOR TRAINING MACHINE LEARNING MODELS

(71) Applicant: Sony Interactive Entertainment Inc., Tokyo (JP)

(72) Inventors: Ryan Spick, London (GB); Timothy Bradley, London (GB); Guy Moss, London (GB); Pierluigi Vito Amadori, London (GB); Ayush Raina, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 343 days.

(21) Appl. No.: 18/430,733

(22) Filed: Feb. 2, 2024

(65) Prior Publication Data

US 2024/0265679 A1 Aug. 8, 2024

(30) Foreign Application Priority Data

Feb. 8, 2023 (GB) ...................................... 2301778

(51) Int. Cl.
*G06V 10/774* (2022.01)
(52) U.S. Cl.
CPC .................................. *G06V 10/774* (2022.01)
(58) Field of Classification Search
CPC .. G06V 10/774; G06V 20/41; G06V 10/7747; G06V 10/454; G06V 10/462; G06V 10/50; G06V 10/771; G06V 10/82; G06V 20/46; G06F 18/2148; G06N 3/08;
(Continued)

(56) References Cited

U.S. PATENT DOCUMENTS

| | | | |
|---|---|---|---|
| 10,539,797 B2 | 1/2020 | Nakashima | |
| 10,841,566 B2 | 11/2020 | He | |
| 2022/0148197 A1* | 5/2022 | Chakraborty | ............ G06T 7/20 |

FOREIGN PATENT DOCUMENTS

| | | |
|---|---|---|
| CN | 115278299 A | 11/2022 |
| WO | 2023089888 A1 | 5/2023 |

OTHER PUBLICATIONS

Combined Search and Examination Report for corresponding GB Application No. 2301778.3, 5 pages, dated Aug. 15, 2023.
(Continued)

*Primary Examiner* — Christopher Wait
(74) *Attorney, Agent, or Firm* — Fish & Richardson P.C.

(57) ABSTRACT

An apparatus for generating datasets for training machine learning models includes: a receiving unit configured to receive video data comprising sequential image frames; a storage unit configured to store a plurality of the sequential image frames; and a selecting unit configured to select, for a target image frame, a subset of stored image frames, the subset providing contextual data relating to the target image frame for the machine learning model. The selecting unit is configured to successively generate sampling values, wherein a difference between successive sampling values increases with each successively generated sampling value; and the selecting unit is configured to select a given image frame from the stored image frames in dependence upon whether a number of sequential image frames between the given image frame and the target image frame coincides with one of the successively generated sampling values.

19 Claims, 5 Drawing Sheets

(58) Field of Classification Search
     CPC ........... G06N 20/00; A63F 13/00; G06T 7/00;
                             G06T 2207/20081
     See application file for complete search history.

(56)                    References Cited

OTHER PUBLICATIONS

Extended European Search Report for corresponding EP Application No. 24153922.0, 7 pages, dated Jun. 21, 2024.
Wu Wenhao, et al., "Multi-Agent Reinforcement Learning Based Frame Sampling for Effective Untrimmed Video Recognition," 2019 IEEE/CVF International Conference on Computer Vision, pp. 6221-6230, Oct. 27, 2019.
Zheng Yin-Dong et al., "Dynamic Sampling Networks for Efficient Action Recognition in Videos," IEEE Transactions on Image Processing, vol. 29, pp. 7970-7983, Jul. 16, 2020.

* cited by examiner

| Receiving Unit 200 | Storage Unit 202 | Selecting Unit 204 |
| --- | --- | --- |
| Frame Nominating Unit 206 | Value Determining Unit 208 | Output Unit 210 |

GENERATING DATASETS FOR TRAINING MACHINE LEARNING MODELS

BACKGROUND OF THE INVENTION

Field of Invention

The present invention relates to an apparatus for generating datasets for training machine learning models, and a method thereof.

Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Imitation learning (IL) is similar to reinforcement learning in that both seek to train a machine learning agent to select the most appropriate actions and/or policies in response to a current state of an environment (which may be real or virtual). However, unlike reinforcement learning, IL does not use a reward function to motivate action/policy selection by the agent. Rather, IL provides the agent with a training dataset that comprises not only environment states but also the most appropriate (or at least desired) action/policy to take in response to such environment states, these actions/policies being enacted by an element situated within the environment (a character/avatar in a movie, video game, or the like).

When this training dataset is provided to an IL agent, the IL agent learns to imitate the actions/policies carried out by the element and also learns the context (environment states) in which the actions/policies were carried out so that when a similar context arises in the subsequent utilisation of the trained IL agent, the agent may carry out the actions/policies that it has learnt to imitate, and thus respond to the context in the most appropriate/desired manner.

The efficacy of IL (that is, its ability to respond to a context in the most appropriate/desired manner) is dependent upon the time period covered by the training data. As a non-limiting example, an IL agent for a video game may be trained, inter alia, to dodge a melee attack. If the IL agent was trained using video footage depicting only an enemy's melee attack and the avatar's corresponding dodge motions, then the IL agent may carry out the dodge in subsequent gameplay in a less effective manner than if the IL agent was trained using video footage depicting the enemy running towards the avatar, the enemy then pulling back their first and performing the melee attack, and then the avatar subsequently dodging the melee attack. This is because, unlike the latter, the former training data set does not provide any pre-attack cues which the IL agent may rely upon for timing their dodge. Thus, when trained using the former training dataset, the IL agent may incorrectly time their dodge (the IL agent may wait for the enemy first to start moving towards them before initiating the dodge animation, for example), and therefore not evade the incoming enemy blow.

While IL agent efficacy is dependent upon the time period covered by the training dataset, simply increasing the amount of data within the training dataset in order to cover larger time periods (simply increasing the number of video frames, for example) is undesirable as doing so would lead to excessive memory usage by the IL agent. This excessive memory usage may impact the performance of the computing system executing the IL agent.

Moreover, a large increase in the amount of data in the training dataset does not necessarily correlate to a large increase in the time period covered by the training dataset. For example, as the frame rate of a video game increases, so does the amount of video data comprised within a given time period, as there is an increase in the number of video frames which fall within the given time period. As a corollary, this increase in frame rate may even cause insufficient training of the IL agent due to the well-known vanishing gradients problem.

The present invention seeks to alleviate or mitigate this issue.

SUMMARY OF THE INVENTION

In a first aspect, an apparatus for generating datasets for training machine learning models is provided in claim 1.

In another aspect, a method of generating datasets for training machine learning models is provided in claim 13.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An apparatus for generating datasets for training machine learning models, and a method thereof are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, an entertainment system is a non-limiting example of such an apparatus.

Figures 1, 2:
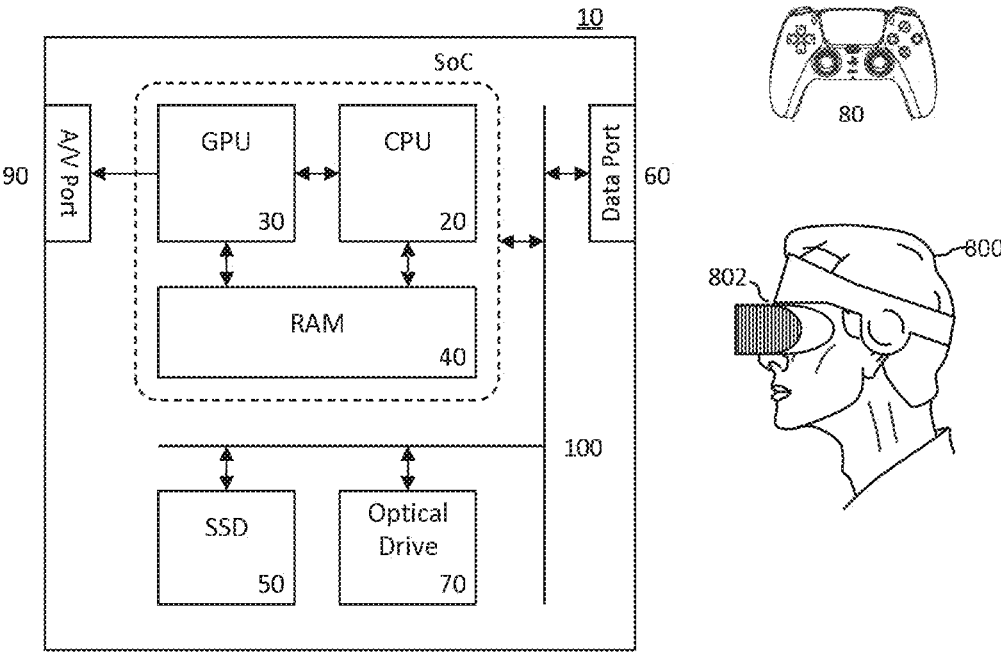
FIG. 1 schematically illustrates an entertainment system operable as an apparatus according to embodiments of the present description.
FIG. 2 schematically illustrates an apparatus according to embodiments of the present description.

Referring now to the drawings, wherein like reference numerals designate identical or corresponding parts throughout the several views, FIG. 1, illustrates an example of an entertainment system 10 such as a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

As mentioned previously, the efficacy of imitation learning (IL) is dependent upon the time period covered by the training data, yet simply increasing the amount of data within the training dataset in order to cover larger time periods is undesirable due to resulting excessive memory usage and vanishing gradients.

Heretofore, frame skipping has been used in order to provide training datasets that cover greater time periods. Frame skipping is a commonly-known technique whereby a subset of image frames are selected from a group of sequential images frames (video footage, for example), the image frames in the subset typically being separated from each other by a set number of sequential video frames. For example, for a group of sequential image frames, a subset comprising the first, third, fifth, and so on (or second, fourth, sixth, and so on) image frames of the group may be created. That is to say, the subset may be created using every other frame of the group. Of course, this frame skipping can be carried out by creating subsets using every third, fourth, fifth, and so on image frames of the group. Hence more generally, heretofore frame skipping has been carried out by utilising a linear relationship between the frame number of image frames in the video footage (v) and the frame number of image frames in the subset (s), namely v=As, where A is a coefficient. The created subset may form at least part of the training dataset for the IL agent.

This technique enables a greater time period to be covered in the resulting training datasets, as the time period between adjacent image frames in the subset may be increased twofold, threefold, fourfold, and so on.

However, this technique is limited in that the distance (that is, the number of sequential images frames and/or time period) between adjacent image frames in the subset is uniform; all image frames in the subset are separated from neighbouring image frames by A sequential image frames of the video footage; a linear relationship exists between the frame number of the frame number of image frames in the video footage and the frame number of image frames in the subset, namely v=As, as mentioned previously. This limitation has heretofore lead persons skilled in the art to make a compromise between the time period covered by the resultant training dataset and the precision with which the key event(s) is/are depicted within the training dataset.

Turning back to the melee attack example, if every other image frame from video footage depicting the enemy running towards the avatar, the enemy then pulling back their first and performing the melee attack, and then the avatar subsequently dodging the melee attack is selected, the key events (the melee attack and dodge) may be depicted with a high precision; the use of every other frame should capture the fast motion of the enemy blow and avatar dodge with adequate precision. However, the time period covered by the resultant training dataset may not be adequate for improving the efficacy of the IL agent; starting at one of the image frames that depicts the avatar dodge and progressing backwards through the video footage, the use of every other frame may generate a training dataset that does not contain any image frames that depict the enemy running towards the avatar due to a limit on the number of image frames (that is, a limit on the amount of data) being imposed on the training dataset. On the other hand, if every fifth image frame from the video footage is selected, then the entire time period covered in the video footage may be covered by the training dataset, but the fast motions of the enemy blow and avatar dodge may not be as precisely captured as when every other image frame was selected (image frames depicting the beginning and end of the melee attack may be selected, but not image frames depicting the movement of the first during the melee attack, for example). This lack of precision may lead to the IL agent being unable to recognise a performance of an identical melee attack in subsequent gameplay.

Thus, there is a need in the art for means that generate training datasets that more effectively cover contexts and corresponding actions/policies over larger time periods (that is, datasets that cover a larger time period than those generated by methods used heretofore while also covering the key events in the context with a similar/higher precision than such methods). Such means would ultimately improve the efficacy of IL agents, as such agents may be provided with a more comprehensive view of the contexts used for training, thereby enabling such agents to learn to respond to such contexts more effectively.

An Apparatus for Generating IL Datasets

Accordingly, turning now to FIG. 2, in embodiments of the present description, an apparatus for generating datasets for training machine learning models comprises: receiving unit 200 configured to receive video data comprising sequential image frames; storage unit 202 configured to store a plurality of the sequential image frames; and selecting unit 204 configured to select, for a target image frame, a subset of stored image frames, the subset providing contextual data relating to the target image frame for the machine learning model; wherein selecting unit 204 is configured to successively generate sampling values, wherein a difference between successive sampling values increases with each successively generated sampling value; and with each successively generated sampling value, selecting unit 204 is configured to select a respective image frame from the stored image frames, wherein a frame number of the given respective image frame coincides with a latest successively generated sampling value.

In essence, embodiments of the present description are directed to a novel non-uniform frame skipping methodology, where the number of image frames skipped increases with each newly selected image frame. As a non-limiting example, one image frame may be skipped before selecting a first image frame for the training dataset (subset), two image frames may be skipped before selecting a second image frame for the dataset, three image frames may be skipped before selecting a third image frame for the dataset, and so on.

Moreover, this non-uniform frame skipping is not necessarily carried out with respect to the first stored image frame or current/most recently received image frame, but rather with respect to a target image that depicts a crucial moment (a key event) within the context depicted in the stored sequential image frames. Thus, the smaller frame skips occur proximate to the target image frame (thereby ensuring that the key event is captured with a relatively higher precision) and the larger frame skips occur away from the target image frame (thereby ensuring that a larger time period is covered in the training dataset, albeit at a relatively lower precision).

It will be appreciated that here the term 'target image' relates to an image used for anchoring/defining the selection process, and not an image to be generated by a machine learning system; typically the selected images, or data representative of them or of features within them, are provided to the IL system as inputs providing context, so that the IL system then outputs target actions/policies appropriate to that context.

As a non-limiting example of the apparatus in operation, consider the aforementioned melee attack example, receiving unit 200 may receive video data related to the melee attack and dodge, and storage unit 202 may store a plurality of sequential image frames of the video data, the stored plurality of sequential image frames comprising at least part of this video data. For example, storage unit 202 may store a plurality of sequential image frames depicting an enemy running towards an avatar, the enemy then pulling back their first and performing the melee attack, and then the avatar subsequently dodging the melee attack. These stored sequential image frames may comprise part or all of the received video data.

For this melee attack example, the target image frame that depicts the crucial moment or key event may be a stored image frame that depicts the beginning of the avatar's dodge as the enemy's first approaches them. This target frame may be tagged as such by a user and/or may be determined as such by the apparatus by considering the respective amounts of data (bits, for example) of each stored image frame, any metadata associated with each image frame such as corresponding controller input data, and/or the image content of each image frame, for example. Such target image frame determination shall be discussed in greater detail later herein.

In any case, once the target image frame has been determined, other stored image frames may be selected by selecting unit 204 to form the training dataset (subset), such selected image frames being selected according to the novel non-uniform frame skipping methodology. Selecting unit 204 may successively generate sampling values, each sampling value essentially representing a number of image frames which should be skipped (when starting at the target image frame or a previously selected, for example), before selecting an image frame for the training dataset.

With each successively generated sampling value, the difference between successive sampling values increases; consider a Fibonacci sequence starting with the numbers 2 and 3, as a non-limiting example. Thus, a non-uniform frame skipping occurs when selecting unit 204 selects stored image frames whose distance away from the target image frame or a previously selected image frame in terms of number of sequential image frames coincides with a latest successively generated sampling value. Alternatively put, a non-uniform frame skipping occurs when selecting unit 204 selects stored image frames whose frame number relative to the target image or to a previously selected image frame coincides with a latest successively generated sampling value. It should be noted that the generated sampling values need not be integers; they may be real numbers (such as 3.768), and the image frame whose distance from the target image frame is closest to the sampling value is selected by selecting unit 204 (an image frame that is 4 sequential image frames away from the target image frame; an image frame with a frame number of 4 relative to the target image frame), for example.

As mentioning previously, this novel non-uniform frame skipping approach results smaller frame skips occurring proximate to the target image frame (thereby ensuring that the key event is captured with a relatively higher precision) and the larger frame skips occur away from the target image frame (thereby ensuring that a larger time period is covered in the training dataset, albeit at a relatively lower precision).

Training datasets generated in accordance with this novel non-uniform frame skipping approach can more effectively cover contexts and corresponding actions/policies over larger time periods (that is, datasets generated in this way may cover a larger time period than those generated by methods used heretofore while also covering the key events in the context with a similar/higher precision than such methods). Such training datasets may therefore improve the efficacy of IL agents, as such agents may be provided with a more comprehensive view of the contexts used for training, which thereby enables such agents to learn to respond to such contexts more effectively.

Receiving Video Data

In embodiments of the present description, receiving unit 200 is configured to receive video data comprising sequential image frames. In embodiments of the present description, receiving unit 200 may be one or more data ports, such as data port 60, USB ports, Ethernet® ports, Wi-Fi® ports, Bluetooth® ports, or the like, for receiving video data from a device external to the apparatus. Alternatively or in addition, receiving unit 200 may be a bus, such as bus 100, for receiving video data from an internal component of the apparatus (CPU(s)/GPU(s) generating/rendering the video data, for example).

Storing Sequential Image Frames

In embodiments of the present description, storage unit 202 is configured to store a plurality of the sequential image frames. In embodiments of the present description, storage unit 202 may be a system memory such as RAM 40, ROM, or the like. In other embodiments, storage unit 210 may be a storage memory such as HDD, SSD 50, CD, Floppy Disk, or the like.

Optionally, storage unit 202 may be a circular buffer. This may be advantageous training datasets may be generated in an on-the-fly manner; games consoles such as the PS5 typically have a circular buffer whose size accommodates a pre-determined number of image frames, with the least recently stored image frame being removed from the circular buffer in order to make way for a to-be-stored image frame (that is, an image frame depicting the now current state of the video game). For a given moment in time during gameplay, the circular buffer may comprise a target frame depicting a key event within a context, this context being desirable for imitation learning purposes. While the target image frame is still within the circular buffer, selecting unit

204 may extract the target image frame and other image frames in order to generate the training dataset. Thus, rather than a useful context and corresponding action/policy demonstration being lost due to the nature of the circular buffer, such information may be extracted for training IL agents.

In any case, storage unit 202 may store a plurality of sequential image frames from which selecting unit 204 may select a subset of image frames (that is, a training dataset).

Selecting a Subset of Image Frames

In embodiments of the present description, selecting unit 204 is configured to select, for a target image frame, a subset of stored image frames, the subset providing contextual data relating to the target image frame for the machine learning model; wherein selecting unit 204 is configured to successively generate sampling values, wherein a difference between successive sampling values increases with each successively generated sampling value; and with each successively generated sampling value, selecting unit 204 is configured to select a respective image frame from the stored image frames, wherein a frame number of the given respective image frame coincides with a latest successively generated sampling value. In embodiments of the present description, selecting unit 204 may be one or more CPUs (such as CPU 20, for example) and/or one or more GPUs (such as GPU 30, for example).

As mentioned previously, each sampling value essentially representing a number of image frames which should be skipped before selecting an image frame for the training dataset. These generated sampling values need not be integers; one or more sampling values may be non-integer real numbers (such as 3.768), and the image frame whose distance from the target image frame that coincides with (is closest to) the sampling value is selected by selecting unit 204 (an image frame that is 4 sequential image frames away from the target image frame; an image frame with a frame number of 4 relative to the target image frame), for example.

In any case, with each successively generated sampling value, the difference between successive sampling values increases. As a non-limiting example, a sequence of successively generated sampling values may be the triangular numbers 1, 3, 6, 10, 14, and so on. As will be appreciated by persons skilled in the art, the difference between two successive values in this sequence increases as the sequence progresses, such difference increasing by 1 with each new sampling value. This sequence may result in a non-uniform frame skipping where one image frame may be skipped before selecting a first image frame for the training dataset (subset), two image frames may be skipped before selecting a second image frame for the dataset, three image frames may be skipped before selecting a third image frame for the dataset, and so on, for example.

For brevity, numerical sequences that demonstrate a behaviour whereby the difference between successive sampling values increases with each successively generated sampling value shall be hereinafter referred to as "expanding sequences".

Other non-limiting examples of expanding sequences comprise: a Fibonacci sequence starting with the numbers 2 and 3 (2, 3, 5, 8, 13, 21, and so on); a geometric series (for an $i^{th}$ iteration of sampling value generation, a sampling value of $$a\sum_{k=1}^{i} r^k$$

may be calculated, where a and r are constants, r≠1); an exponential sequence or sequence of powers (for an $i^{th}$ iteration of sampling value generation, a sampling value of $r^i$ may be calculated, where r≠1 and typically 1<r<2); a sequence of values computed using a non-linear function (for an $i^{th}$ iteration of sampling value generation, a sampling value of $i^n$ may be calculated, where n≠1); and a finite series that is not a geometric series (as a non-limiting example, for an $i^{th}$ iteration of sampling value generation sampling value of $$b\sum_{k=1}^{i} k^n$$

may be calculated, where b and n are constants, the triangular numbers arising when b, n=1).

It should be noted that the preceding list of non-limiting examples are not exhaustive; persons skilled in the art will appreciate that expanding sequences other than those mentioned previously are considered within the scope of the present description.

Figures 3A, 3B, 3C:
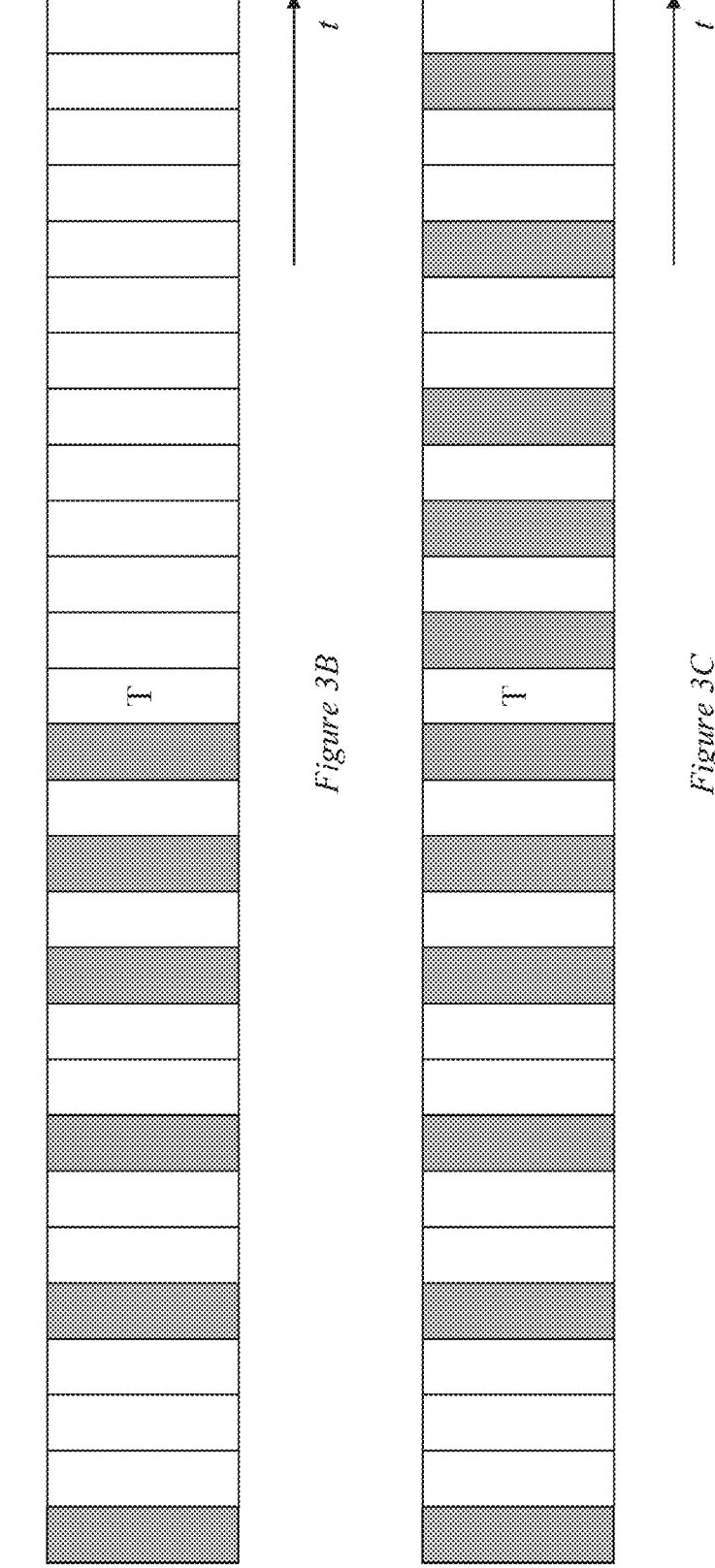
FIGS. 3A-3C schematically illustrate the manner by which image frames may be selected for training dataset according to embodiments of the present description.

As will be appreciated by persons skilled in the art, the image frames selected for the subset may be those received at receiving unit 200 prior to and/or subsequent to the target image frame being received thereat, as depicted in FIGS. 3A-3C. In FIGS. 3A-3C, a sampling function of f(i)=i$^{1.5}$ (where i is the iteration number), was used by selecting unit 204 to successively generate sampling values in order to subsequently select image frames for the subset (training dataset) from a plurality of stored sequence image frames (depicted as white and grey rectangles, the target image frame being marked with a "T").

In FIG. 3A, selecting unit 200 has selected a subset of stored image frames (depicted as grey rectangles) within which only those image frames which were received at receiving unit 200 subsequent to the target image frame being received thereat are comprised. This subset may therefore provide an IL agent with futureward data relating to (that is, the aftermath of) the key event/crucial moment depicted in the stored image frames. Such futureward data may be important as they may enable the IL agent to learn how effective a given action/policy is once executed, especially when an important consequence of said action/policy does not occur immediately afterwards. For example, the target frame may depict a football player kicking the ball towards a goal; the consequence of this shot (whether or not the shot results in a goal), may only be depicted in several image frames later, with the number of image frames between shot and (no) goal increasing with distance from the goal the shot was taken.

In FIG. 3B, selecting unit 200 has selected a subset of stored image frames within which only those image frames which were received at receiving unit 200 prior to the target image frame being received thereat are comprised. This subset may therefore provide an IL agent with historical data relating to (that is, the build-up to) the key event/crucial moment depicted in the stored image frames. Such historical data may be important as they may enable the IL agent to learn how to more effectively time the execution of the action/policy. For example, within the aforementioned melee attack and dodge context, the efficacy of the dodge is dependent upon the timing of its execution. As such, the historical context depicted within the training dataset may enable the IL agent to learn how to dodge more effectively, as such historical data may comprise pre-attack cues which the IL agent may rely upon for timing their dodge.

In FIG. 3C, both futureward and historical data is obtained. That is to say, selecting unit 200 has selected a subset of stored image frames within which image frames that were received at receiving unit 200 prior to and subsequent to the target image frame being received thereat are comprised.

As will be appreciated by persons skilled in the art, using expanding sequences of sampling values enables the generation of training datasets that can more effectively cover contexts and corresponding actions/policies over larger time periods. That is to say, datasets generated in this way may cover a larger time period than those generated by methods used heretofore while also covering the key events in the context with a similar/higher precision than such methods, as depicted in FIGS. 4A-4E.

Figures 4A, 4B, 4C:
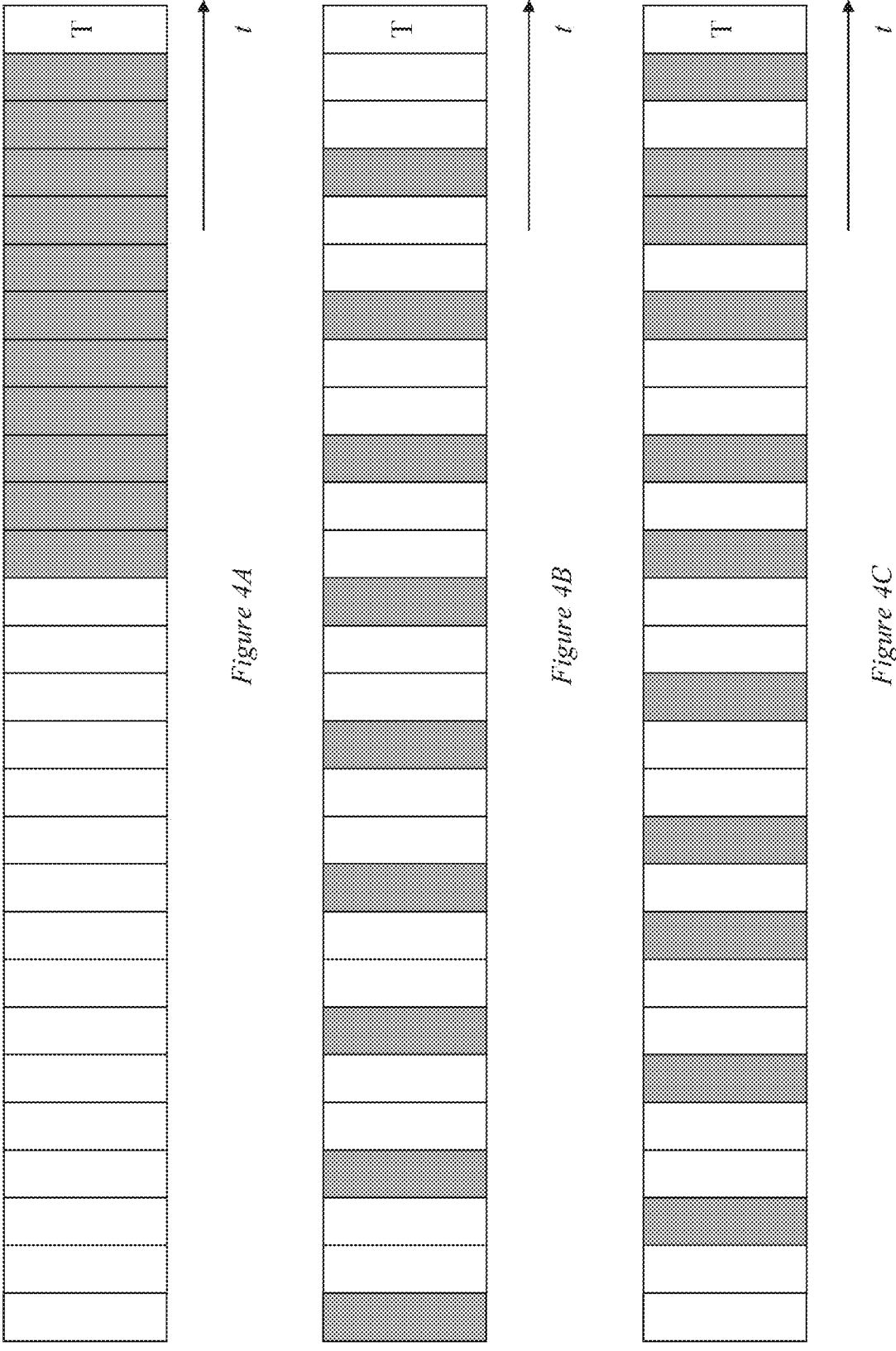
FIGS. 4A-4E schematically illustrate a comparison between image frame selection methodologies known in the art and image frame selection according to embodiments of the present description.

In FIG. 4A, no frame skipping was used when selecting image frames for a training dataset. While this results in the key event depicted in the target frame being captured with the highest precision possible (that is, all frames within the selected subset are sequential, with the most recent image frame of the subset being adjacent to the target frame), the time period covered may not be sufficiently large enough to enable an IL agent to learn how to more effectively time the execution of an action/policy.

In FIG. 4B, a uniform frame skipping of 3 was used when selecting image frames for a training dataset. That is to say, every third stored image frame was selected for the subset. While this results in a larger time period (thus more historical data) being covered in the training dataset (a threefold increase compared with FIG. 4A), the key event depicted in the target frame may not be captured with a sufficiently high precision to enable the IL agent to recognise a performance of an identical key event in subsequent gameplay.

In FIG. 4C, the novel non-uniform frame skipping methodology according to embodiments of the present description was used when selecting image frames for a training dataset. Sampling values were generated by selecting unit 204 by using the sampling function $f(i)=i^{1.35}$, and stored images frames whose respective frame number relative to the target image frame coincided with (were closest to) a respective one of the sampling values were selected. This results in a training dataset that combines the advantages of both of the preceding examples; the key event depicted in the target frame has been captured with a higher precision compared with that of FIG. 4B (3 out of the 4 most recent stored image frames received prior to the target frame were selected for the subset), and a larger time period has been covered compared with that of FIG. 4A (due to the frame skipping). Thus, not only can the IL agent learn how to more effectively time the execution of the action/policy, but may also be able to recognise a performance of an identical key event in subsequent gameplay.

Figures 4D, 4E:
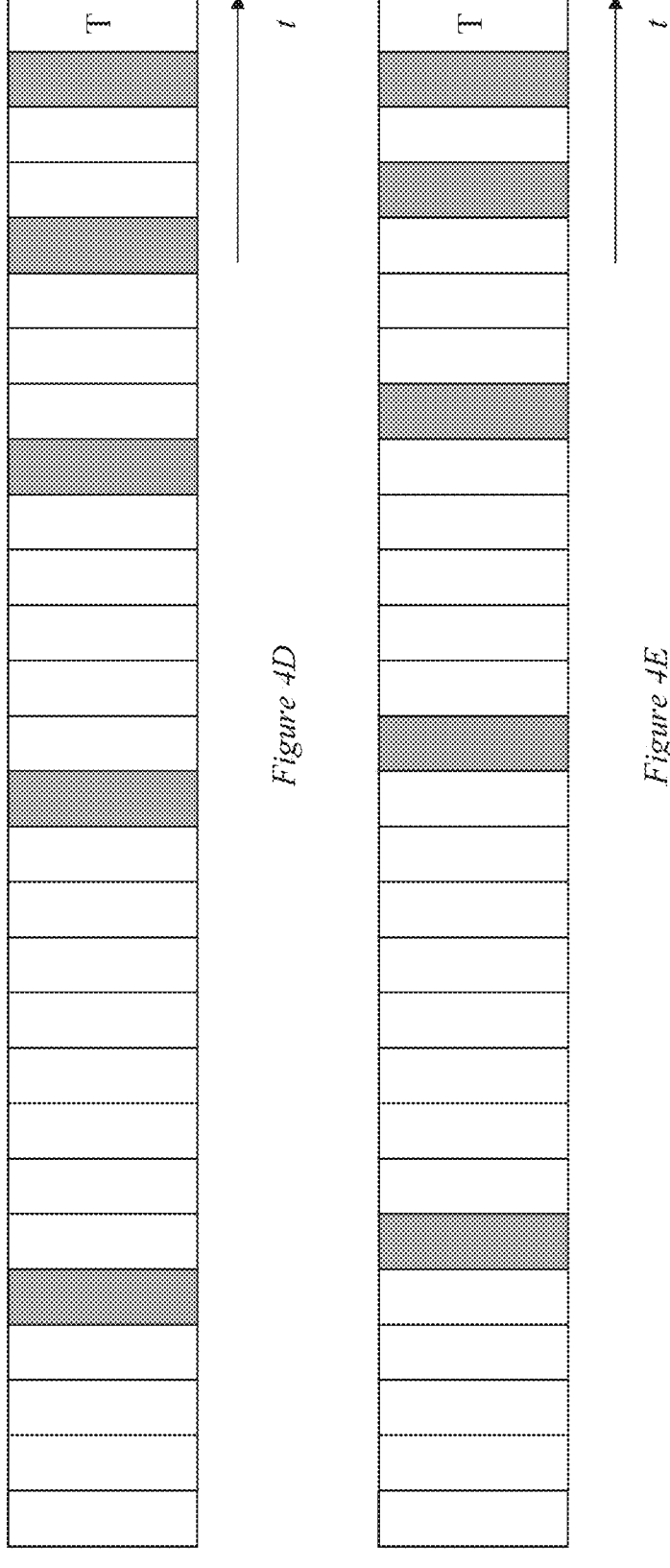

In FIG. 4D, the same novel non-uniform frame methodology has been carried out using the sampling function $f(i)=i^{1.35}$. However, instead of selecting those stored image frames whose respective distance from (respective frame number relative to) the target image frame coincides with (were closest to) a respective one of the sampling values, a given stored image frame was selected based on whether its distance from (frame number relative to) a previously selected stored image frame coincided with a latest successively generated sampling value. This selecting method is advantageous in that it ensures that the distance between successively selected image frames increases with each successively selected image frame, and thereby cover a greater time period in the training dataset; the selection method carried out in FIG. 4C may not reliably ensure that distances between selected image frames increase in such a manner due to rounding/aliasing errors (two consecutive image frames were selected in FIG. 4C). It will be appreciated that for lower exponential values (e.g. $f(i)=i^{1.10}$) then the distance between successively selected image frames may be the same for short parts of the sequence, particularly early on for example while the value of the function grows by less than one for each iteration; but the distance between frames will not get smaller.

Hence more generally, while the discussion heretofore has been related to selecting stored image frames based on whether their respective distance from (respective frame number relative to) the target image frame coincided with a respective sampling value, persons skilled in the art will readily appreciate that with each successively generated sampling value, selecting unit 204 is configured to select a respective image frame from the stored image frames, wherein a frame number of the respective image frame coincides with a latest successively generated sampling value.

In particular, persons skilled in the art will appreciate that the frame number of the given respective image frame may be relative to one selected from the list consisting of: i. the target image frame; and ii. a previously selected image frame.

In FIG. 4E, the same novel non-uniform frame methodology has been carried out using the sampling function $f(i)=i^{1.35}$. However, a combination of the selecting methods depicted in FIGS. 4C and 4D has been used to select stored image frames. The first two selected image frames (that is, the two image frames most proximate to the target image frame) have been selected using the selecting method of FIG. 4C (selecting based on whether distance from target image frame coincides with a respective sampling value), and the other selected image frames have been selected using the selecting method of FIG. 4D (selecting based on whether distance from a previously selected image frame coincides with a respective sampling value). Such a combination of selecting methods may be used to ensure that the distance between successively selected image frames increases with each successively selected image frame, and thereby cover a greater time period in the training dataset. Again, if the exponential or other growth function is set to a low growth value, the increase may be by less than one frame per iteration and so some parts of the sequence may have the same frame separation, but over time the separation will increase but never decrease.

As will be appreciated by persons skilled in the art, selecting unit 204 may be configured to successively generate sampling values by using some form of algorithm or relation; the Fibonacci sequence is an example of a recurrence relation where the next Fibonacci number is calculated by summing the previous two Fibonacci numbers. As will be appreciated by persons skilled in the art, other recurrence relations may be used to generate expanding sequences.

Optionally, selecting unit 204 may be configured to successively generate sampling values by using a sampling function, the sampling function being a mathematical function. Within the context of the present description, whereas a recurrence relation requires knowledge of previously generated sampling values in order to generate the next one, a sampling function does not require such knowledge. Rather, the sampling value may be generated by using the iteration number (inputting the number 5 for the fifth iteration in order to obtain the fifth sampling value, for example). Non-limiting examples of such sampling functions may be seen in the aforementioned list of expanding sequences.

For some such sampling functions, an extent to which the difference between successive sampling values increases with each successively generated sampling value may be responsive to a respective value of one or more sampling parameters comprised within the sampling function. As a non-limiting example, a sequence of powers of 3 (1, 3, 9, 27, 81, and so on) will expand at a greater rate than that of a sequence of powers of 2 (1, 2, 4, 8, 16, and so on). Moreover, a sequence of the powers of 2 multiplied by some coefficient greater than 1 (such as 1.5, which yields 1.5, 3, 6, 12, 24, and so on) will expand at a greater rate than that of the powers of 2. Thus, for a more general sampling function of $f(i)=a \times k^i$, where i is the iteration number, changing the values of either a or k will change the rate of expansion of the expanding sequence. Thus a and k may be thought of as sampling parameters within the context of the present description.

Optionally, at least one of the sampling parameters is at least one of a coefficient, a base and an exponent. As will be appreciated by persons skilled in the art, the sampling parameters of the sampling function $f(i)=a \times k^i$ are a coefficient (a) and a base (k). For a sampling function of $f(i)=i^n$, the sampling parameter n is an exponent. Of course, sampling parameters need not be limited to these three types of term/parameter; person skilled in the art will appreciate that other terms/parameters such as summands, dividends, divisors, radicands, and the like, may be used as sampling parameters.

In any case, and as will be appreciated by persons skilled in the art, the value(s) of the sampling parameter(s) may be predetermined or user defined, immutable or dynamically adjustable.

Regarding dynamically adjustable sampling parameters, embodiments of the present description may optionally comprise value determining unit 208, which may be configured to determine, based on image content of the target image frame, the respective values of one or more of the sampling parameters. In embodiments of the present description, value determining unit 208 may be one or more CPUs (such as CPU 20, for example) and/or one or more GPUs (such as GPU 30, for example).

That is to say, the image content of target frame may be used to determine the rate of expansion of the expanding sequence of sampling values. For example, value determining unit 208 may determine that the aforementioned target frame depicting the beginning of the avatar's dodge warrants larger sampling parameter value(s) than a frame depicting, say, the beginning of an avatar's standing jump over a static virtual object (a stone, for example). The latter may not need much historical and/or futureward data (that is, image frames depicting the environment and avatar prior to and/or subsequent to the target image frame, respectively) compared with that of the former, as the efficacy with which an IL agent jumps over obstacles may be less dependent on timing than the efficacy with which an IL agent dodges an incoming attack.

In order for value determining unit 208 to make a determination as to what values respective sampling parameters should take, value determining unit 208 may be configured to detect one or more virtual elements comprised within the image content of the target image frame by using any commonly known computer vision/object recognition techniques/algorithms.

The terms "computer vision algorithm" and "object recognition algorithm" refer to any suitable computer-implemented method, software, algorithm, or the like, which causes a computer (such as the apparatus described herein)

to recognise/detect objects, animals, humans, or the like from captured images. Such algorithms are well-known in the art, examples of which include Viola-Jones detection methods (optionally based on Haar features), scale-invariant feature transforms (SIFTs), histogram of oriented gradients (HOG) features, and the like. Alternatively or in addition, machine learning and methods, neural networks, artificial intelligence, or the like may be used to recognise/detect objects and the like. Examples of neural network approaches include multilayer perceptrons (MLPs), convolutional neural networks (CNNs), region based convolutional neural networks (R-CNNs), single shot multi-box detectors (SSDs), you only look once (YOLO) methods, single-shot refinement neural networks for object detection (Refine-Dets), Retina-Net, deformable convolutional networks, and the like.

In any case, once the virtual element(s) comprised within the image content of the target image frame have been detected, value determining unit 208 may be configured to determine, based on the detected virtual element(s) within the image content, the respective values of one or more of the sampling parameters. Value determining unit 208 may be configured to do so by taking into account each detected virtual element's colour(s), size, shape, and/or location within the target image frame, a description of each detected virtual element (avatar, ally, enemy, weapon, object, building, and the like; this description coming from computer vision/objection recognition algorithms, for example), or the like.

Alternatively or in addition, value determining unit 208 may comprise a value determining model that is trained to determine, based on the image content of the target image frame, the respective values of one or more of the sampling parameters. For example, the value determining model may be trained using individual image frames that are respectively associated with one or more sampling parameter values. Thus, the value determining model may learn to correlate the pixel data of the target image frame with values of one or more sampling parameters without needing to understand what the pixel data represents. Alternatively or in addition, the results of any computer vision/objection recognition algorithms may be utilised in the training of value determining model. That is to say, for a given image frame that is associated with one or more sampling parameter values, value determining unit 208 may be configured to detect one or more virtual elements comprised within the given image frame, and the detected virtual elements and sampling parameter values (and optionally the given image frame itself) may be input to the value determining model for training purposes.

In any case, optionally if a given sampling parameter is a base or an exponent, then the value of the given sampling parameter is greater than one. As will be appreciated by persons skilled in the art, this is to ensure that any sampling functions utilising bases and/or exponents as sampling parameters produce expanding sequences of sampling values. Moreover, persons skilled in the art will appreciate that other types of sampling parameter do not necessarily have to be greater than one; coefficients may be less than or equal to one and an expanding sequence of sampling values may still be generated (a sampling function of $$f(i) = b \sum\nolimits_{k=1}^{i} k^n$$

may still generate expanding sequences even if coefficient b≤1). That is not to say that all other types of sampling parameter may take on any value and still generate expanding sequences of sampling values, however; there may be some upper and/or lower bound associated with a given sampling parameter the exceedance of which precludes the generation of expanding sequences of sampling values.

In any case, once the value(s) of the sampling parameter(s) is/are known, selecting unit 204 may successively generate sampling values, each sampling value essentially representing a number of image frames which should be skipped before selecting an image frame for the training dataset. Given that with each successively generated sampling value, the difference between successive sampling values increases, a non-uniform frame skipping occurs when selecting unit 204 selects stored image frames whose distance away from the target image frame (or a previously selected image frame) in terms of number of sequential image frames coincides with (is closest to, for example) one of the sampling values. Alternatively put, a non-uniform frame skipping occurs when selecting unit 204 selects stored image frames whose frame number relative to the target image or to a previously selected image frame coincides with a latest successively generated sampling value.

The resulting subset of selected image frames (training dataset) may optionally be output to an IL agent in order to train the IL agent. Hence more generally, embodiments of the present description may comprise output unit 210 configured to output the subset of stored image frames to a machine learning model (IL agent, for example) in order to train the machine learning model. In embodiments of the present description, output unit 210 may be may be one or more data ports, such as data port 60, USB ports, Ethernet® ports, Wi-Fi® ports, Bluetooth® ports, or the like, for outputting the subset of stored image frames to a machine learning model external to the apparatus. Alternatively or in addition, receiving unit 200 may be a bus, such as bus 100, for outputting the subset of stored image frames to a machine learning model located within the apparatus. As will be appreciated by persons skilled in the art, output unit 210 may also be configured to output the target image frame to the machine learning model for training purposes.

In any case, training datasets generated in accordance with this novel non-uniform frame skipping approach can more effectively cover contexts and corresponding actions/policies over larger time periods (that is, datasets generated in this way may cover a larger time period than those generated by methods used heretofore while also covering the key events in the context with a similar/higher precision than such methods). Such training datasets may therefore improve the efficacy of IL agents, as such agents may be provided with a more comprehensive view of the contexts used for training, which thereby enables such agents to learn to respond to such contexts more effectively.

Other Embodiment(s)

As mentioned previously, a target frame may be tagged as such by a user. This tagging of the target frame may occur before or after receiving unit 200 has received the video data. As a non-limiting example, the user may have associated metadata/a flag with a given image frame within the video data prior to receiving unit 200 receiving the video frames, said metadata/flag providing an indication that the image frame with which it is associated is the target image frame. Hence more generally, selecting unit 204 may be configured to select a given stored image frame to be a target image frame based on metadata associated therewith.

Alternatively or in addition, and as another non-limiting example, after video has been received at receiving unit 200, a user may use a games controller (such as controller 80) to tag/select one of the stored image frames as a target image frame. Hence more generally, receiving unit 200 may be configured to receive one or more user inputs, and selecting unit 204 may be configured to select, based on one or more of the received user inputs, one of the stored image frames to be a target image frame. Moreover, the user inputs may be received from one or more of: a user input device (a game controller, mouse, keyboard, mobile phone, or the like); a camera (standalone or comprised within a computer, mobile phone, head mounted display, TV, user input device, or the like); and a microphone (standalone or comprised within a computer, mobile phone, head mounted display, TV, user input device, or the like).

It will be appreciated that the tagging need not be a conscious act by the user; that is to say, it is not essential to have a dedicated 'tag' input; rather, changes in inputs relating to gameplay may be treated as tags, such as changes in direction of in-game movement (optionally changes above a thresholds, such as for example changing direction or starting/stopping movement, as opposed to drifting or incidental motion), pressing buttons to attack, defend, jump, and the like.

It should be noted that the preceding examples are not exhaustive; persons skilled in the art will appreciate that types of devices operable to transmit user inputs to receiving unit 200 other than those mentioned previously are considered within the scope of the present description.

Optionally, embodiments of the present description may comprise frame nominating unit 206 configured to determine whether a particular image frame of the stored image frames is to be the target image frame, the frame nominating unit being to do so based on one or more indicia pertaining to the particular image frame. In embodiments of the present description, frame nominating unit 206 may be one or more CPUs (such as CPU 20, for example) and/or one or more GPUs (such as GPU 30, for example).

Optionally, one or more of the indicia pertaining to the particular image frame may comprise metadata associated therewith. This metadata may comprise one or more of: user-defined metadata (tags/flags that are associated with image frames before/after receiving unit 200 receives the video data, as mentioned previously); event codes indicating what event is occurring within the image content of the particular image frame (an event code indicating a melee attack, for example); location metadata indicating a location within an environment (real or virtual) the particular image frame was captured/generated; and time metadata indicating a time at which the particular image frame was captured/generated, this time being a real-world time or a time relative to the powering on of the device capturing/generating the particular image frame.

It should be noted that the preceding examples are not exhaustive; persons skilled in the art will appreciate that types of metadata other than those mentioned previously are considered within the scope of the present description.

Alternatively or in addition, one or more of the indicia pertaining to the particular image frame may comprise image content of the particular image frame. As will be appreciated by persons skilled in the art, the discussion with respect to value determining unit 208 may be applied here, mutatis mutandis; computer vision/object recognition algorithms may be employed to determine whether the particular image frame should be the target image frame.

Alternatively or in addition, one or more of the indicia pertaining to the particular image frame may comprise an amount of data of particular image frame. That is to say, the size of the particular image frame in terms of a number of bits may be used to determine whether the particular image frame should be the target image frame. For example, frame nominating unit 206 may be configured to determine whether a particular image frame of the stored image frames is to be the target image frame based on whether an amount of data of the particular image frame meets or exceeds a threshold amount of data (number of bits, for example). As will be appreciated by persons skilled in the art, the threshold amount of data may be predetermined or user defined, immutable or dynamically adjustable.

Whilst the embodiments herein may generate datasets for training purposes, optionally the data may be 'live', that is to say, the data may be generated during one or more play-throughs of a game and provided to the IL system as it is generated. This may also optionally provide a time stamp or other indicator of real time progression to the IL system (although such time data may also be associated with offline datasets). Such play-throughs may be performed by quality assurance testers, beta testers, early adopters or the like.

Optionally an instance of a trained IL may be refined, for example by training on play by an individual user, to more closely mimic the play of that user.

Summary Embodiment(s)

Hence, in a summary embodiment of the present description an apparatus for generating data (whether live data or datasets) for training machine learning models comprises: receiving unit 200 configured to receive video data comprising sequential image frames; storage unit 202 configured to store a plurality of the sequential image frames; and selecting unit 204 configured to select, for a target image frame, a subset of stored image frames, the subset providing contextual data relating to the target image frame for the machine learning model; wherein selecting unit 204 is configured to successively generate sampling values, wherein a difference between successive sampling values increases with each successively generated sampling value; and with each successively generated sampling value, selecting unit 204 is configured to select a respective image frame from the stored image frames, wherein a frame number of the respective image frame coincides with a latest successively generated sampling value, as described elsewhere herein.

It will be apparent to persons skilled in the art that variations in the aforementioned apparatus as described and claimed herein are considered within the scope of the present invention, including but not limited to that:

In an instance of the summary embodiment, the frame number of the respective image frame is relative to one selected from the list consisting of: i. the target image frame; and ii. a previously selected image frame, as described elsewhere herein;

In an instance of the summary embodiment, selecting unit 200 is configured to successively generate sampling values by using a sampling function, the sampling function being a mathematical function, as described elsewhere herein;

In this instance, optionally an extent to which the difference between successive sampling values increases with each successively generated sampling value is responsive to a value of a sampling parameter comprised within the sampling function, as described elsewhere herein;

In this instance, optionally at least one of the sampling parameters is at least one of a coefficient, a base and an exponent, as described elsewhere herein;

In this instance, optionally the apparatus comprises value determining unit 208 configured determine, based on image content of the target image frame, the value of the sampling parameter, as described elsewhere herein;

In this instance, optionally the value of the sampling is greater than one, as described elsewhere herein;

In an instance of the summary embodiment, the apparatus comprises frame nominating unit 206 configured to determine whether a particular image frame of the stored image frames is to be the target image frame, the frame nominating unit being to do so based on one or more indicia pertaining to the particular image frame, as described elsewhere herein;

In this instance, optionally one or more of the indicia pertaining to the particular image frame comprises metadata associated therewith, as described elsewhere herein;

In this instance, optionally one or more of the indicia pertaining to the particular image frame comprises image content of the particular image frame, as described elsewhere herein;

In this instance, optionally one or more of the indicia pertaining to the particular image frame comprises an amount of data of particular image frame, as described elsewhere herein;

In an instance of the summary embodiment, the apparatus comprises output unit 210 configured to output the subset of stored image frames to a machine learning model in order to train the machine learning model, as described elsewhere herein; and In an instance of the summary embodiment, storage 202 is a circular buffer, as described elsewhere herein.

A Method of Generating IL Datasets

Figure 5:
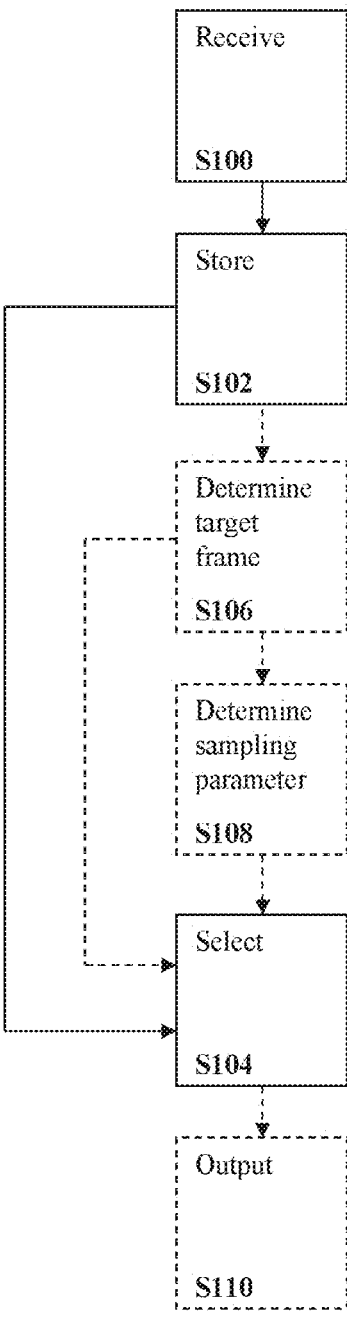
FIG. 5 schematically illustrates a method according to embodiments of the present description.

Turning now to FIG. 5, a method of generating data for training machine learning models comprises the following steps.

Step S100: receiving video data comprising sequential image frames, as described elsewhere herein. Step S102: storing a plurality of the sequential image frames, as described elsewhere herein. Step S104: selecting, for a target image frame, a subset of stored image frames, the subset providing contextual data relating to the target image frame for the machine learning model, wherein the selecting step comprises: successively generating sampling values, wherein a difference between successive sampling values increases with each successively generated sampling value; and selecting a respective image frame from the stored image frames, wherein a frame number of the respective image frame coincides with a latest successively generated sampling value.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment device 10) suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus for generating data for training machine learning models, comprising:
   a receiving unit configured to receive video data comprising sequential image frames;
   a storage unit configured to store a plurality of the sequential image frames; and
   a selecting unit configured to select, for a target image frame, a subset of stored image frames, the subset providing contextual data relating to the target image frame for the machine learning model;
   wherein
      the selecting unit is configured to successively generate sampling values, wherein a difference between successive sampling values increases with each successively generated sampling value; and
      with each successively generated sampling value, the selecting unit is configured to select a respective image frame from the stored image frames,
   wherein a frame number of the respective image frame coincides with a latest successively generated sampling value.

2. An apparatus according to claim 1, wherein the frame number of the respective image frame is relative to one selected from the list consisting of:
   i. the target image frame; and
   ii. a previously selected image frame.

3. An apparatus according to claim 1, wherein the selecting unit is configured to successively generate sampling values by using a sampling function, the sampling function being a mathematical function.

4. An apparatus according to claim 3, wherein an extent to which the difference between successive sampling values increases with each successively generated sampling value is responsive to a respective value of one or more sampling parameters comprised within the sampling function.

5. An apparatus according to claim 4, wherein at least one of the sampling parameters is at least one of a coefficient, a base and an exponent.

6. An apparatus according to claim 4, comprising a value determining unit configured to determine, based on image content of the target image frame, the respective values of one or more of the sampling parameters.

7. An apparatus according to claim 4, wherein if a given sampling parameter is a base or an exponent, then the value of the given sampling parameter is greater than one.

8. An apparatus according to claim 1, comprising a frame nominating unit configured to determine whether a particular image frame of the stored image frames is to be the target image frame, the frame nominating unit being to do so based on one or more indicia pertaining to the particular image frame.

9. An apparatus according to claim 8, wherein one or more of the indicia pertaining to the particular image frame comprises metadata associated therewith.

10. An apparatus according to claim 8, wherein one or more of the indicia pertaining to the particular image frame comprises image content of the particular image frame.

11. An apparatus according to claim 8, wherein one or more of the indicia pertaining to the particular image frame comprises an amount of data of particular image frame.

12. An apparatus according to claim 1, comprising an output unit configured to output the subset of stored image frames to a machine learning model in order to train the machine learning model.

13. An apparatus according to claim 1, wherein the storage unit is a circular buffer.

14. A method of generating data for training machine learning models, comprising:
   receiving video data comprising sequential image frames;
   storing a plurality of the sequential image frames; and
   selecting, for a target image frame, a subset of stored image frames, the subset providing contextual data relating to the target image frame for the machine learning model;
   wherein the selecting step comprises:
      successively generating sampling values,
         wherein a difference between successive sampling values increases with each successively generated sampling value; and
      with each successively generated sampling value, selecting a respective image frame from the stored image frames,
   wherein a frame number of the respective image frame coincides with a latest successively generated sampling value.

15. One or more non-transitory computer-readable media that store instructions which, when executed by one or more computer processors, cause the one or more computer processors to perform operations comprising:
   generating a training dataset for training an imitation learning model, comprising:
      obtaining a sequence of image frames;
      selecting a target image frame from the sequence of images frames;
      storing the target image frame in the training dataset;
      selecting an initial number N;
      until a desired quantity of image frames from the sequence are stored in the training dataset, iteratively:
         incrementing number N according to a linear function;
         selecting an image frame of the multiple sequential image frames that is earlier or later in the sequence than a most recently stored image frame, and that is associated with the number N; and
         storing the selected image frame in the training dataset; and
   training the imitation learning model based at least on the generated training dataset.

16. The media of claim 15, wherein storing the selected image frame comprises skipping storing number N other image frames in the sequence that are between the selected image frame and the most recently stored image frame.

17. The media of claim 15, wherein the imitation model enables an agent to imitation actions of a human player in a video game.

18. The media of claim 15, wherein, in sequential iterations, the number N is incremented by adding 1, then 2, then 3, then 4.

19. The media of claim 15, wherein the selected image frame is later in the sequence than the most recently stored image frame.

\* \* \* \* \*